Patented Aug. 20, 1929.

1,725,136

UNITED STATES PATENT OFFICE.

HANS HAHL, OF ELBERFELD, GERMANY, ASSIGNOR TO WINTHROP CHEMICAL COMPANY, INC., OF NEW YORK, N. Y., A CORPORATION OF NEW YORK.

BASIC PHENOLALKYLETHER.

No Drawing. Application filed March 22, 1928, Serial No. 263,973, and in Germany April 11, 1927.

The present invention relates to compounds of the probable general formula:

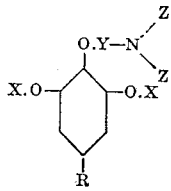

wherein the Xs represent alkyl groups, y represents an alkylene group, the Zs represent hydrogen or alkyl at least one Z being alkyl, and R represents an unsaturated aliphatic radical.

The new compounds are obtainable by causing a compound of the general formula:

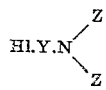

wherein Hl represents halogen, Y represents an alkylene group and the Zs represent hydrogen or alkyl, at least one Z being alkyl, to react upon a compound of the general formula:

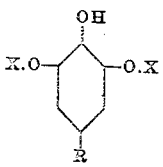

wherein the Xs represent alkyl groups and R represents an unsaturated aliphatic radical.

The new substances are mostly liquids possessing a basic odor and form neutral salts with acids which salts retain the therapeutically valuable properties of the new products and are soluble in water. They can be used for subcutaneous injection. They exhibit a pronounced action on uterus and are therefore valuable substitutes for secale cornutum.

*Example:* 12 parts by weight of 4-alkyl-2.6-dimethoxy-1-phenol and 12 parts by weight of diethyl amino ethyl chloride are dissolved in 50 parts by weight of alcohol, to which solution is added a solution of 15 parts by weight of sodium in 50 parts by weight of alcohol. Heating for some time is then effected, the alcohol is distilled off and the residue is decomposed with water. An oil separates, which is removed and fractionated. The diethyl amino ethyl ether of 4-allyl-2.6-dimethoxy-1-phenol distils at 5 mm. pressure at 146–151° C. as a yellow colored oil, which has the following constitution:

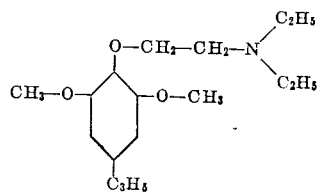

forming a water-soluble hydrochloride. Other phenols or other dialkyl-aminohalogenides can be used, e. g. dimethylaminoethylchloride, 4-crotyl-2.6-dimethoxy-1-phenol etc.

I claim:

1. As new products compounds of the probable general formula:

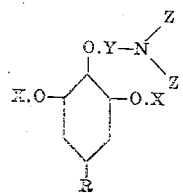

wherein the Xs represent alkyl groups, Y represents an alkylene group, the Zs represent hydrogen or alkyl, at least one Z being alkyl, and R represents an unsaturated aliphatic radical, being generally oils possessing a basic odor, forming water-soluble salts with acids, being valuable substitutes for secale cornutum, substantially as described.

2. As a new product the diethylaminoethyl-ether of 4-allyl-2.6-dimethoxy-1-phenol of the probable general formula:

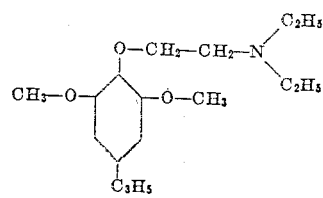

being a yellow oil boiling at 146–151° C. under a pressure of 5 mm. and forming a hydrochloride soluble in water and being a valuable substitute for secale cornutum, substantially as described.

In testimony whereof I have hereunto set my hand.

HANS HAHL.